May 9, 1950     T. E. SULLIVAN     2,507,284

ANIMAL TRAP

Filed Aug. 5, 1948

Thomas E. Sullivan
INVENTOR.

BY *Clarence A. O'Brien*
*and Harvey B. Jackson*
Attorneys

Patented May 9, 1950

2,507,284

UNITED STATES PATENT OFFICE 2,507,284

ANIMAL TRAP

Thomas E. Sullivan, Roseville, Ill., assignor of one-half to Howard W. Simmons, Avon, Ill.

Application August 5, 1948, Serial No. 42,683

2 Claims. (Cl. 43—79)

This invention relates to new and useful improvements and structural refinements in animal traps, and the principal object of the invention is to firmly and securely grip the animal so as to prevent the same from escaping.

In particular, the invention is primarily intended for animals such as gophers, foxes, and the like, and the invention contemplates the provision of a trap which is simple in construction, convenient for installation in various locations, and above all, sensitive to the passage of animals over the trigger thereof.

An important advantage of the invention resides in its simplicity of construction and in the convenience with which it may be reset.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
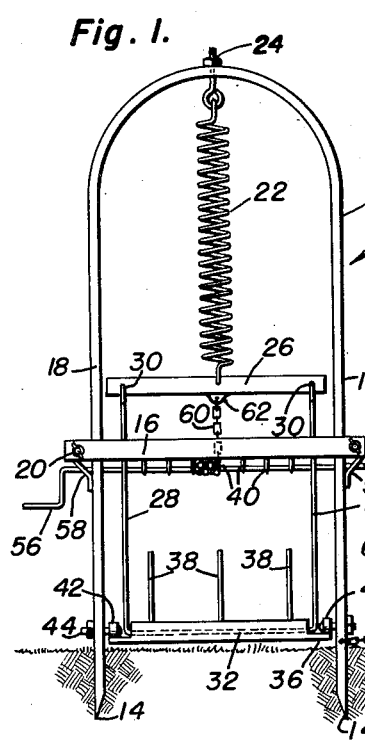
Figure 1 is a front elevational view of the invention in its "set" position.

Referring now to the accompanying drawings in detail, the invention consists of animal trap designated generally by the reference character 10, the same embodying in its construction a substantially upright, inverted U-shaped frame 12 formed by suitably actuating a cylindrical bar or rod, the end portion of this frame terminating in pointed extremities 14 adapted for insertion in the ground, whereby the entire trap is supported in a substantially upright position, as shown.

A stationary jaw 16, preferably consisting of a pair of spaced parallel members, is adjustably positioned on intermediate portions of the spaced side members 18 of the frame 12, the adjustable attachment of the jaw 16 to the side members 18 being facilitated by providing the end portions of the jaw with suitable clamping screws 20 which, upon loosening, permit the jaw to be slid upwardly or downwardly on the side members, as will be clearly apparent.

One end of a strong tension spring 22 is adjustably anchored as at 24 to the upper, arcuate portion of the frame 12, the remaining end of the spring being connected to the mid-portion of an equalizing bar 26 disposed above the stationary jaw 16. A U-shaped guide rod 28 is provided at the upper ends of its side portions with suitable eyes 30 whereby it is movably or pivotally connected to the end portions of the bar 26. The side portions of the rod 28 extend slidably through the jaw 16, and the intermediate, lower portion of the rod passes through a tubular coacting jaw 32. The latter is provided in the end portions thereof with suitable bushings 34 to rotatably receive the intermediate portion of the rod 28, and it is to be noted that the ends of the tubular jaw 32 terminate in substantially semi-tubular portions 36 which constitute what may be referred to as detents.

The jaw 32 is also provided with a set of radially extending tripping fingers 38, while the stationary jaw 16 is equipped with a set of downwardly extending, pointed teeth 40.

Figures 2, 3:
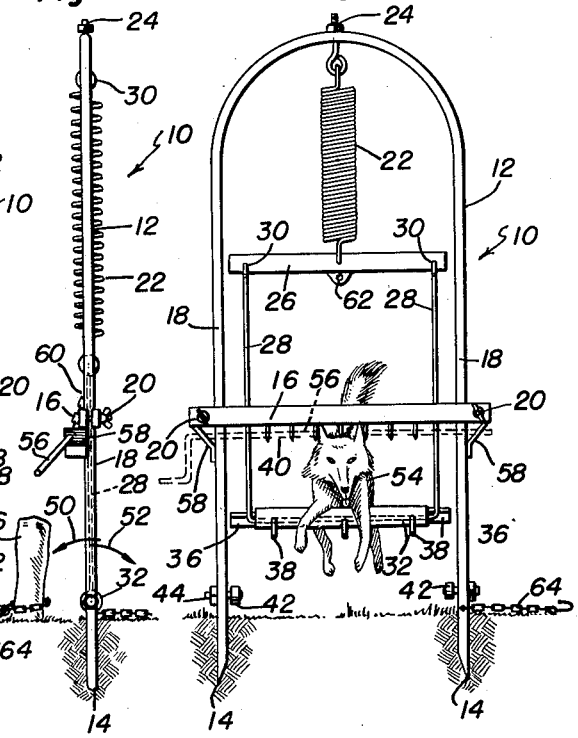
Figure 2 is a side elevational view thereof.
Figure 3 is a front elevational view, similar to that shown in Figure 1, but illustrating the invention in its "sprung" position.
Figure 4:
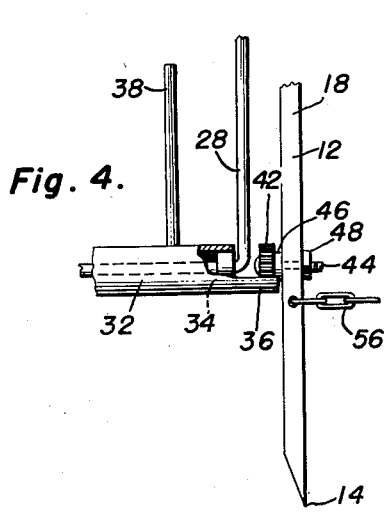
Figure 4 is a fragmentary elevational detail, partially broken away, illustrating the arrangement of the jaw and trigger structure used in the invention.
Figure 5:
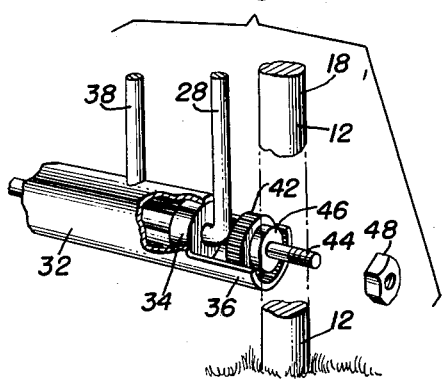
Figure 5 is a fragmentary perspective view, partially broken away, of the structure shown in Figure 4.

The lower end portions of the side members 18 of the frame 12 are provided with a pair of mutually opposed rollers 42 which are rotatably mounted upon suitable studs 44, equipped with appropriate washers 46 and lock nuts 48 and are so arranged that the semi-tubular end portions of the jaw 32 are engageable with the rollers 42 when the jaw 32 is in its "set" position, as illustrated in Figures 1, 2, 4 and 5. It is to be noted that in this position, the trigger fingers 38 are directed upwardly, so that when an animal passes through the trap and engages the fingers 38, the latter are swung either in the direction 50 or in the direction 52 (see Figure 2) depending upon the direction in which the animal is traveling. In either event, swinging of the fingers 38 will cause rotation of the jaw 32 on the lower portion of the rod 28, and as a result, the portions 36 of the jaw 32 will rotate with and become eventually disengaged from the rollers 42, so that the jaw 32 will be permitted to move upwardly in a violent manner, in response to the resiliency of the tension spring 22. The animal, indicated at 54, will thus be securely trapped between the jaw 32 and the teeth 40 on the stationary jaw 16, and it will be apparent that by simply adjusting the position of the jaw 16 on the side members 18, the trap may be adjusted to accommodate animals of various sizes.

It may be added that the jaw 16, in addition to its primary function of trapping the animal, will provide effective guides for the rod 28, and it will be apparent that the trap may be reset by simply pulling the jaw 32 downwardly against the resiliency of the spring 22 and thereafter rotating the jaw 32 so that the fingers 38 thereof project upwardly while the portions 36 thereof are engaged by the rollers 42.

The resetting of the trap may be effected by means of a hand crank 56 rotatably journaled in suitable brackets 58 provided at the ends of the jaw 16, the brackets 58 slidably engaging the frame 12. A flexible element such as a chain 60 is anchored at one end thereof as at 62 to the aforementioned bar 26 and is windable on the crank 56, so as to draw the bar 26 and the jaw 32 downwardly to a "set" position of the latter. The chain 60 may be disconnected from the bar 26 and the crank 56 removed from the brackets 58 when the resetting operation is completed.

If desired, the entire trap may be attached by means of a suitable chain 64, or the like, to some rigid member, such as for example, a tree 66, so as to safeguard against the possibility of the animal escaping together with the trap as a whole. It may be also added that the instant trap is primarily intended for use in passageways, gates, and the like, wherein the animals must necessarily pass over the jaw 32 of the trap in order to gain access to the area which is to be protected therefrom.

It is believed that the advantages and use of the invention will be clearly apparent from the foregoing disclosure and accordingly, a further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. An animal trap comprising a substantially upright frame including a pair of spaced side members, a stationary jaw adjustably secured to said side members intermediately of said frame, downwardly projecting teeth on said stationary jaw, a pair of spaced and substantially upright guide rods extending slidably through said stationary jaw, a coacting jaw rotatably mounted at the lower ends of said rods, an equalizing bar pivoted at the ends thereof to the upper ends of said rods, a tension spring extending downwardly from the upper end of said frame and connected to said bar for drawing said coacting jaw upwardly to said stationary jaw, and trigger means for releasably retaining said coacting jaw in a lowered position.

2. The device as defined in claim 1, wherein said means include tripping fingers provided on said coacting jaw for rotating the latter upon passage of an animal thereover, arcuate detents at the ends of said coacting jaw, and a pair of rollers on said side members, said detents being engageable with said rollers.

THOMAS E. SULLIVAN.

REFERENCES CITED

The following references are of record in the file of this patent:

UNITED STATES PATENTS

| Number | Name | Date |
|---|---|---|
| 663,022 | Granbery | Dec. 4, 1900 |

FOREIGN PATENTS

| Number | Country | Date |
|---|---|---|
| 73,469 | Germany | Feb. 15, 1894 |